United States Patent
Zhang et al.

(10) Patent No.: US 10,783,092 B2
(45) Date of Patent: Sep. 22, 2020

(54) BASEBOARD MANAGEMENT CONTROLLER SWITCHING METHOD FOR SHARING NETWORK PROTOCOL

(71) Applicants: INVENTEC (PUDONG) TECHNOLOGY CORPORATION, Shanghai (CN); INVENTEC CORPORATION, Taipei (TW)

(72) Inventors: Xi-Lang Zhang, Shanghai (CN); Guo-Xin Sun, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/135,789

(22) Filed: Sep. 19, 2018

(65) Prior Publication Data
US 2020/0057734 A1      Feb. 20, 2020

(30) Foreign Application Priority Data
Aug. 14, 2018   (CN) .......................... 2018 1 0922086

(51) Int. Cl.
*G06F 13/10*     (2006.01)
*H04L 12/24*     (2006.01)
(Continued)

(52) U.S. Cl.
CPC ........ *G06F 13/102* (2013.01); *H04L 41/0803* (2013.01); *H04L 41/24* (2013.01); *H04L 43/0805* (2013.01); *G06F 13/4068* (2013.01)

(58) Field of Classification Search
None
See application file for complete search history.

(56) References Cited

U.S. PATENT DOCUMENTS

2006/0209680 A1* 9/2006 Lee ..................... H04L 12/5692
                                                                    370/217
2008/0005748 A1* 1/2008 Mathew .............. G06F 11/0712
                                                                    719/318
(Continued)

FOREIGN PATENT DOCUMENTS

CN          1295286 A      5/2001
TW       200619943 A      6/2006
(Continued)

OTHER PUBLICATIONS

Taiwanese Office Action issued in corresponding application No. TW 107128843, dated Oct. 30, 2019.

*Primary Examiner* — Charles E Anya
(74) *Attorney, Agent, or Firm* — Maschoff Brennan

(57) ABSTRACT

A method for switching a shared network protocol of a baseboard management controller comprises: determining whether a mainboard is connected with an external network card by a baseboard management controller; determining whether an external network card network port of the external network card is connected with a network cable by the baseboard management controller when the mainboard is connected with the external network card; connecting a physical link of a shared network protocol of the baseboard management controller with the external network card network port when the external network card network port is connected with the network cable; and connecting the physical link of the shared network protocol of the baseboard management controller with a mainboard network port of the mainboard when the external network card network port is not connected with the network cable. As a result, the shared network protocol can be maintained in normal operation.

10 Claims, 5 Drawing Sheets

(51) Int. Cl.
    *H04L 12/26*     (2006.01)
    *G06F 13/40*     (2006.01)

(56) References Cited

U.S. PATENT DOCUMENTS

| | | | |
|---|---|---|---|
| 2008/0137658 A1 | 6/2008 | Wang | |
| 2010/0180133 A1* | 7/2010 | Chen | H04L 12/12 713/310 |
| 2013/0024719 A1* | 1/2013 | Zhang | H04L 41/0659 714/4.11 |
| 2013/0159588 A1* | 6/2013 | Yao | G06F 11/221 710/306 |
| 2014/0115112 A1* | 4/2014 | Wang | H04L 49/90 709/219 |
| 2015/0082063 A1 | 3/2015 | Peterson et al. | |
| 2016/0057007 A1* | 2/2016 | Hsu | H01R 13/7175 709/223 |
| 2016/0248648 A1* | 8/2016 | Chen | H04L 29/08072 |
| 2017/0155573 A1* | 6/2017 | Khemani | H04L 41/0663 |
| 2018/0239730 A1* | 8/2018 | Itkin | G06F 13/385 |

FOREIGN PATENT DOCUMENTS

| | | |
|---|---|---|
| TW | 200825762 A | 6/2008 |
| TW | 200943074 A | 10/2009 |
| TW | 201018137 A | 5/2010 |
| TW | 201114219 A | 4/2011 |
| TW | 201220078 A | 5/2012 |

\* cited by examiner

BASEBOARD MANAGEMENT CONTROLLER SWITCHING METHOD FOR SHARING NETWORK PROTOCOL

CROSS-REFERENCE TO RELATED APPLICATIONS

This non-provisional application claims priority under 35 U.S.C. § 119(a) on Patent Application No(s). 201810922086.1 filed in China on Aug. 14, 2018 the entire contents of which are hereby incorporated by reference.

BACKGROUND OF THE INVENTION

Technical Field of the Invention

The present disclosure is related to a method for switching network protocols, and more particularly to a method for switching network protocols of a baseboard management controller.

Description of the Related Art

A server usually configures an external network card, such as a PCIE network card or an OCP network card. A shared network protocol of the server's baseboard management controller may enable a network port between a mainboard and the external network card. For examples, If the server is configured with an OCP network card, a physical link of the shared network protocol of the baseboard management controller will be connected to the network port of the OCP network card. If the server is not configured with an OCP network card, the physical link of the shared network protocol of the baseboard management controller is connected to two mainboard network ports. At present, the baseboard management controller may only switch the physical link of the shared network protocol between two network ports of the external network card or between the two mainboard network ports. There is no way to switch the physical link of the shared network protocol between the mainboard network port and the network port of the external network card. In this way, when the two network ports of the external network card have faults or a network cable is pulled out from the two network ports of the external network card, the baseboard management controller can't switch the physical link of the shared network protocol from the external network card to the mainboard, which results that the shared network protocol can't operate normally.

In view of the foregoing situations, there is indeed a need for an improved method for switching network protocols, which at least may improve above shortcomings.

SUMMARY OF THE INVENTION

The present disclosure provides a method for switching a shared network protocol of a baseboard management controller in accordance with an embodiment, which may ensure that the shared network protocol continues to operate normally.

The present disclosure provides a method for switching a shared network protocol of a baseboard management controller in accordance with an embodiment, and the switching method comprises: determining whether a mainboard is connected with an external network card by a baseboard management controller; determining whether external network card network ports of the external network card are connected with network cables by the baseboard management controller when the mainboard is connected with the external network card; connecting a physical link of a shared network protocol of the baseboard management controller with the external network card network ports when the external network card network ports are connected with the network cables; and connecting the physical link of the shared network protocol of the baseboard management controller with mainboard network ports when the external network card network ports are not connected with the network cables.

According to the method for switching the shared network protocol of the baseboard management controller in accordance with an embodiment, the baseboard management controller actively may switch the physical link of the shared network protocol from the external network card network ports to the mainboard network ports when the baseboard management controller detects that all of the external network card network ports are not connected with network cables via an inter-integrated circuit bus. On the other hand, when there is only one external network card network port reconnected with a network cable, the baseboard management controller actively may switch the physical link of the shared network protocol from the mainboard network ports to the external network card network ports. In this way, the shared network protocol may be maintained in a normal working state.

The above description of the disclosure and the following descriptions of the embodiments of the present disclosure are intended to illustrate and explain spirits and principles of the present disclosure.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
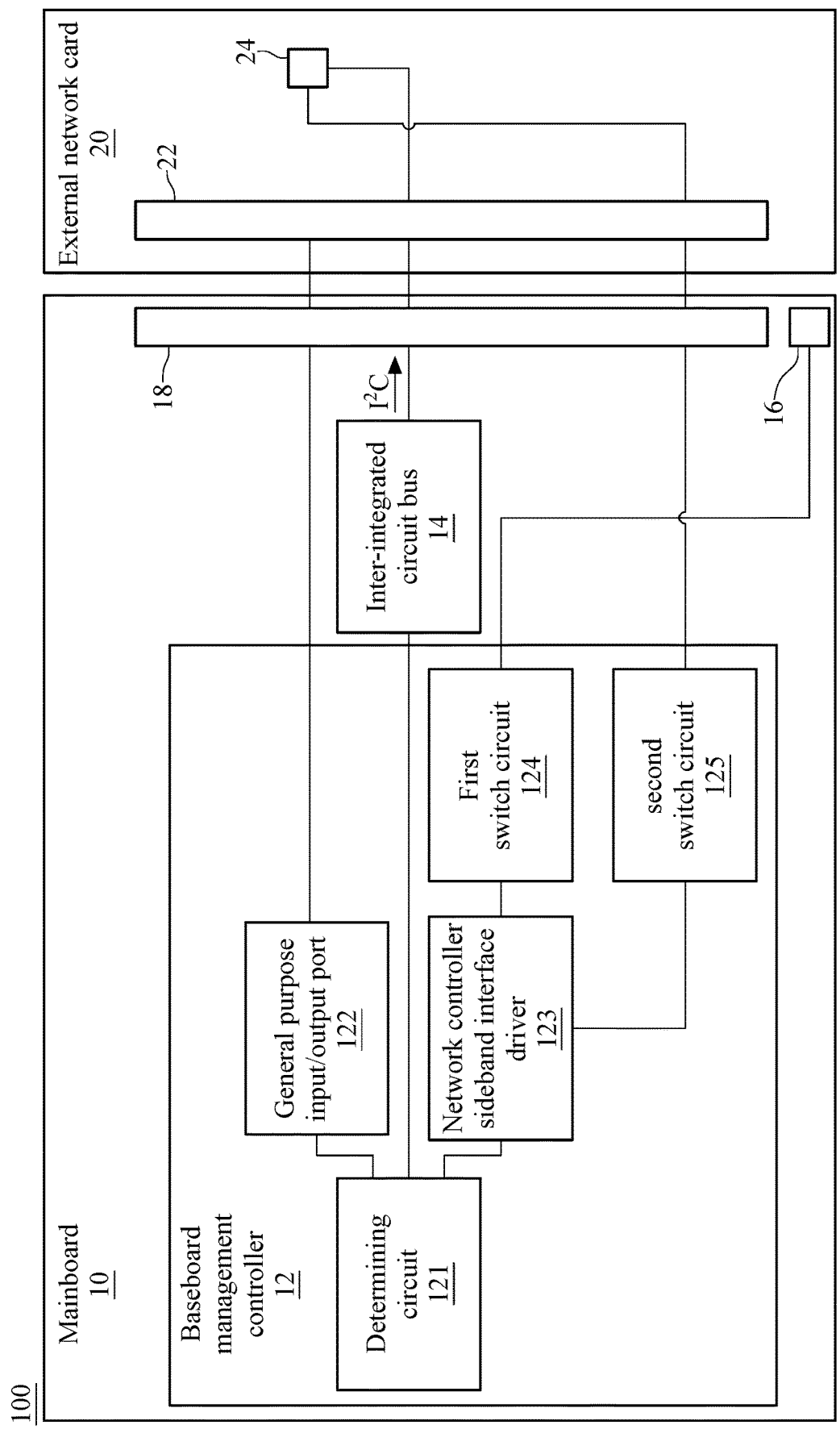
FIG. 1 is an architecture diagram of hardware devices of a server in accordance with an embodiment of the present disclosure.

FIG. 1 is an architecture diagram of hardware devices of a server in accordance with an embodiment of the present disclosure. As shown in FIG. 1, a server 100 comprises a mainboard 10 and an external network card 20, the mainboard 10 includes a baseboard management controller 12, an inter-integrated circuit bus 14, a mainboard network port 16 and a network card slot 18, the baseboard management controller 12 is coupled with the inter-integrated circuit bus 14, and the inter-integrated circuit bus 14 is coupled with the network card slot 18. The mainboard network port 16 is a RJ45 type network port, and in the other embodiment, the mainboard network port 16 may be a RJ11 type-network port or a USB type-network port. The baseboard management controller 12 includes a determining circuit 121, a general purpose input/output (GPIO) port 122, a network controller sideband interface (NCSI) driver 123, a first switch circuit 124 and a second switch circuit 125. The determining circuit 121 is respectively coupled with the general purpose input/output port 122, the network controller sideband interface driver 123 and the inter-integrated circuit bus 14. The network controller sideband interface driver 123 is respectively coupled with the first switch circuit 124 and the second switch circuit 125, the first switch circuit 124 is coupled with the mainboard network port 16, and the second switch circuit 125 is coupled with the network card slot 18. In this embodiment, the first switch circuit 124 and the second switch circuit 125 are implemented by NPN type-BJT. In the other embodiment, the first switch circuit 124 and the second switch circuit 125 further may be implemented by NPN type-NMOS or PMOS, or be implemented by PNP type-BJT, NMOS or PMOS.

The external network card 20 includes an electrical connection portion 22 corresponding to the network card slot 18 and an external network card network port 24, and the electrical connection portion 22 is coupled with the external network card network port 24, the external network card network port 24 is a RJ45 type network port. In the other embodiment, the external network card network port 24 may be a RJ11 type network port or a USB type network port. When the electrical connection portion 22 of the external network card 20 is plugged into the network card slot 18 of the mainboard 10 and is electrically connected with the network card slot 18, the general purpose input/output port 122 of the baseboard management controller 12 has a first voltage level, otherwise the general purpose input/output port 122 has a second voltage level which is different from the first voltage level when the electrical connection portion 22 of the external network card 20 is removed from the network card slot 18 of the mainboard 10. In this embodiment, the second voltage level is smaller than the first voltage level. In this way, the determining circuit 121 of the baseboard management controller 12 may determine whether the external network card 20 is electrically connected to the mainboard 10 by detecting a difference of a voltage level of the general purpose input/output port 122. Moreover, under a condition that the external network card 20 is electrically connected to the mainboard 10, the determining circuit 121 determines whether the external network card network port 24 is connected to a network cable by contents of inter-integrated circuit bus signals I²C transmitted to the inter-integrated circuit bus 14. When the external network card network port 24 is not connected with a network cable, the determining circuit 121 may instruct the network controller sideband interface driver 123 to output a first signal to the first switch circuit 124 to cause that the first switch circuit 124 is in a turn-on state and also instruct the network controller sideband interface driver 123 to output a second signal to the second switch circuit 125 to cause that the second switch circuit 125 is in a cut-off state. In this way, the physical link of the shared network protocol of the baseboard management controller 12 is connected with the mainboard network port 16 of the main board 10 and is disconnected from the external network card network port 24 of the external network card 20. Otherwise, the determining circuit 121 instructs the network controller sideband interface driver 123 to output the second signal to the first switch circuit 124 to cause that the first switch circuit 124 is in a cut-off state when the external network card network port 24 is connected with a network cable, and also instructs the network controller sideband interface driver 123 to output the first signal to the second switch circuit 125 to cause that the second switch circuit 125 is in a turn-on state. As a result, the physical link of the shared network protocol of the baseboard management controller 12 is disconnected from the mainboard network port 16 of the mainboard 10 and is connected with the external network card network port 24 of the external network card 20.

Figure 2:
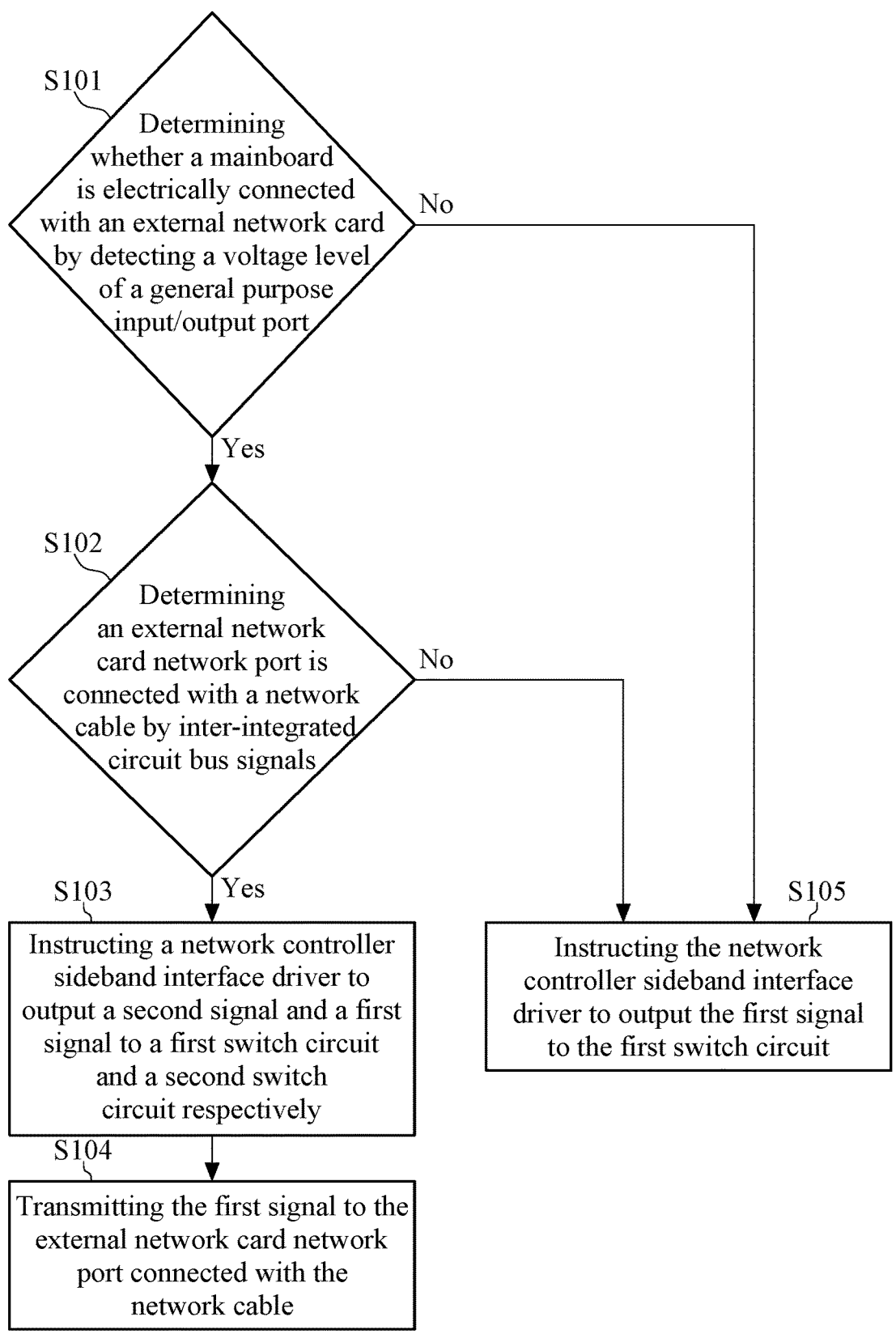
FIG. 2 is a flowchart of a method for switching a shared network protocol of a baseboard management controller in accordance with a first embodiment of the present disclosure.

FIG. 2 is a flowchart of a method for switching a shared network protocol of a baseboard management controller in accordance with a first embodiment of the present disclosure. As shown in FIG. 2, the method for switching the shared network protocol of the baseboard management controller comprises following steps: Step 101 is detecting a voltage level of the general purpose input/output port 122 of the baseboard management controller 12 by the determining circuit 121 of the baseboard management controller 12, the mainboard 10 is electrically connected with the external network card 20 when the detected voltage level of the general purpose input/output port 122 is a first voltage level. Step 102 is determining whether the external network card network port 24 of the external network card 12 is connected with a network cable by the contents of the inter-integrated circuit bus signals I²C transmitting to the inter-integrated circuit bus 14 when the mainboard 10 is electrically connected with the external network card 20. Step 103 is instructing the network controller sideband interface driver 123 of the baseboard management controller 12 to output the second signal and the first signal to the first switch circuit 124 and the second switch circuit 125 respectively by the determining circuit 121 of the baseboard management controller 12 when the external network card network port 24 is connected with a network cable, wherein a voltage level of the first signal turns on the second switch circuit 125 and a voltage level of the second signal can't turn on the first switch circuit 124, which means that the physical link of the shard network protocol of the baseboard management controller 12 is connected with the external network card network port 24 of the external network card 20 and is disconnected from the mainboard network port 16 of the mainboard 10. Step 104 is enabling the external network card network port 24 by transmitting the first signal to the external network card network port 24 of the external network card 20 when the second switch circuit 125 is in a turn-on state.

In Step 101, the mainboard 10 is not electrically connected with the external network card 20 when the determining circuit 121 of the baseboard management controller 12 detects that a voltage level of the general purpose input/output port 122 of the baseboard management controller 12 is a second voltage level, and then proceed to Step 105. Step 105 is instructing the network controller sideband interface driver 123 to output the first signal to the first switch circuit 124 by the determining circuit 121 of the baseboard management controller 12, wherein a voltage level of the first signal turns on the first switch circuit 124, which means that the physical link of the shared network protocol of the baseboard management controller 12 is connected with the mainboard network port 16 of the mainboard 10. In Step 102, when the determining circuit 121 of the baseboard management controller 12 determines that the external network card network port 24 is not connected with a network cable, and then proceed to Step 105.

Figure 3:
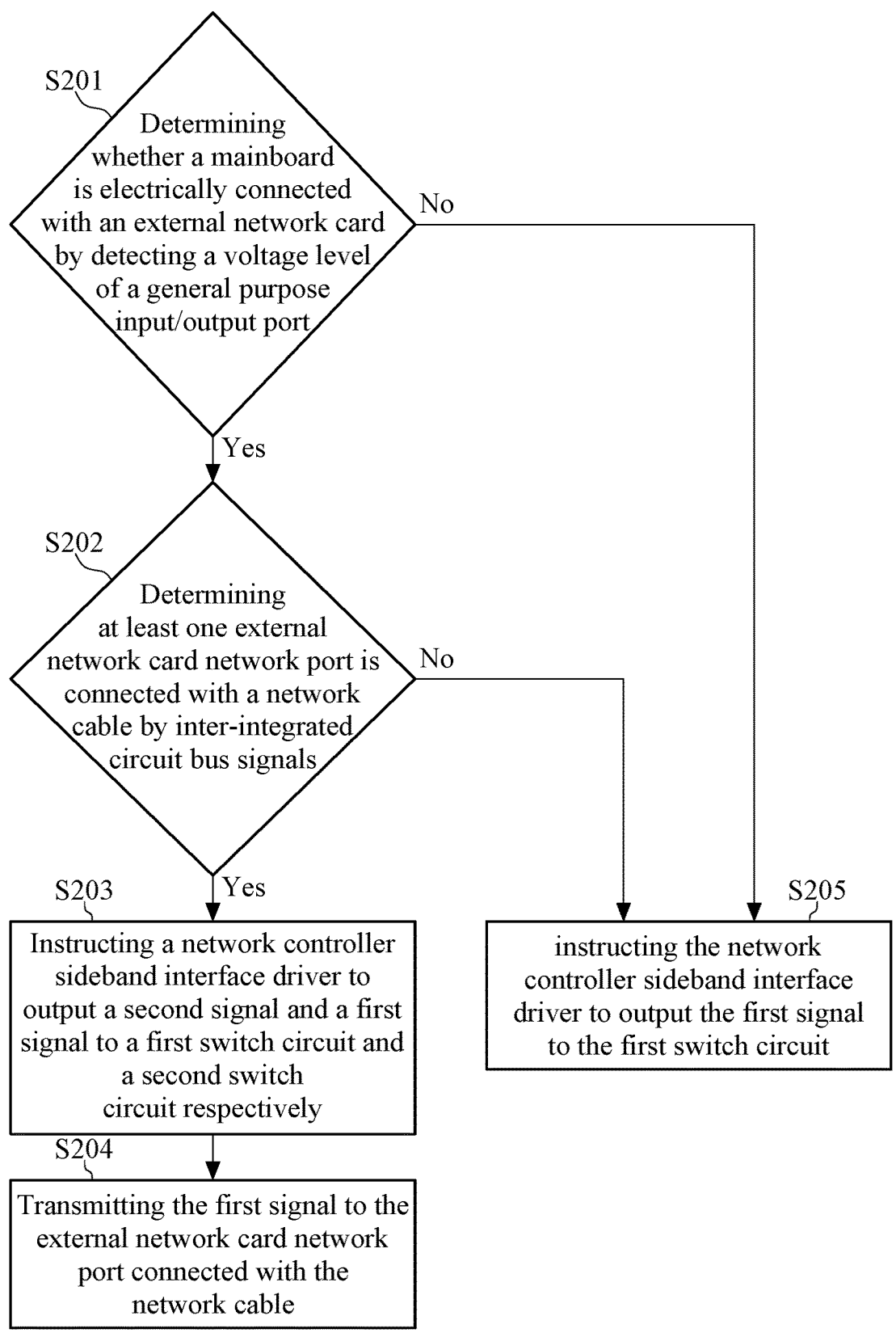
FIG. 3 is a flowchart of a method for switching a shared network protocol of a baseboard management controller in accordance with a second embodiment of the present disclosure.

FIG. 3 is a flowchart of a method for switching a shared network protocol of a baseboard management controller in accordance with a second embodiment of the present disclosure. Differences between the second embodiment and the first embodiment comprise following contents: the number of the external network card network port 24 is plural and the number of the mainboard network port 16 is plural. Step 202 is determining whether each of the external network card network ports 24 of the external network card 12 is connected with a network cable by the contents of the inter-integrated circuit bus signals I²C transmitting to the inter-integrated circuit bus 14. Step 203 is instructing the network controller sideband interface driver 123 to output the first signal and the second signal to the second switch circuit 125 and the first switch circuit 124 respectively to cause that the second switch circuit 125 is in a turn-on state and the first switch circuit 124 is in a cut-off state by the determining circuit 121 of the baseboard management controller 12, which means that the physical link of the shared network protocol of the baseboard management controller 12 is connected with each of the external network card network port 24 of the external network card 20 and is disconnected from each of the mainboard network ports 16. Step 204 is enabling the external network card network port 24 by transmitting the first signal to the external network card network port 24 connected with a network cable when the second switch circuit 125 is in a turn-on state.

In Step 202, when the determining circuit 121 of the baseboard management controller 12 determines that each of the external network card network port 24 is not connected with a network cable, and then proceed to Step 205. Step 205 is instructing the network controller sideband interface driver 123 to output the first signal to the first switch circuit 124 to turn on the first switch circuit 124 by the determining circuit 121 of the baseboard management controller 12, which means that the physical link of the shared network protocol of the baseboard management controller 12 is connected with each of the mainboard network ports 16 of the mainboard 10.

Figure 4:
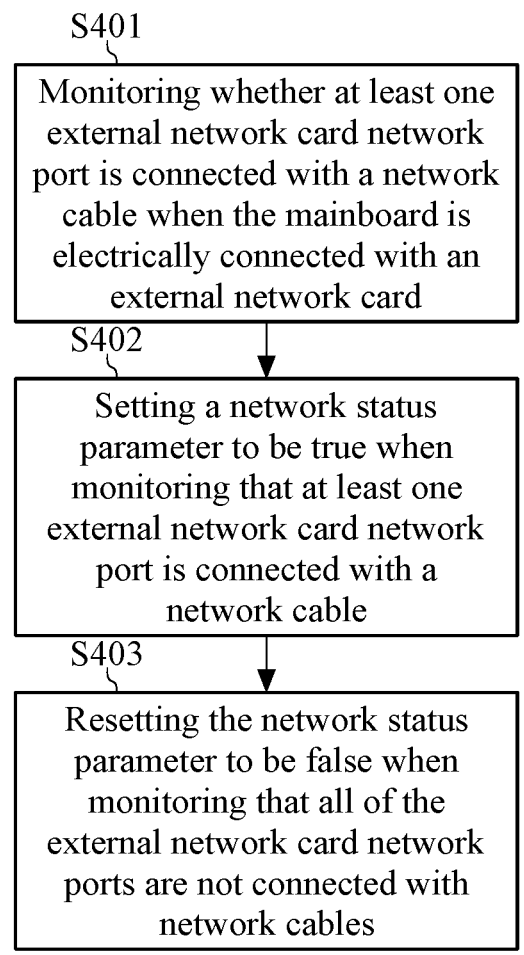
FIG. 4 is a flowchart of a method for monitoring a network connection status of an external network card via a baseboard management controller in accordance with a first embodiment of the present disclosure.

In one embodiment of the present disclosure, the baseboard management controller 12 may continuously monitor a network connection status of the external network card 20. FIG. 4 is a flowchart of a method for monitoring a network connection status of an external network card by a baseboard management controller in accordance with a first embodiment of the present disclosure. As shown in FIG. 4, Step 401 is that the baseboard management controller continuously monitors whether at least one external network card network port is connected with a network cable by the inter-integrated circuit bus. Step 402 is setting a network status parameter to be true by the baseboard management controller when the baseboard management controller monitors that at least one external network card network port is connected with a network cable. Step 403 is resetting the network status parameter to be false when the baseboard management controller monitors that all of the external network card network ports are not connected with network cables after the network status parameter was set as true.

Figure 5:
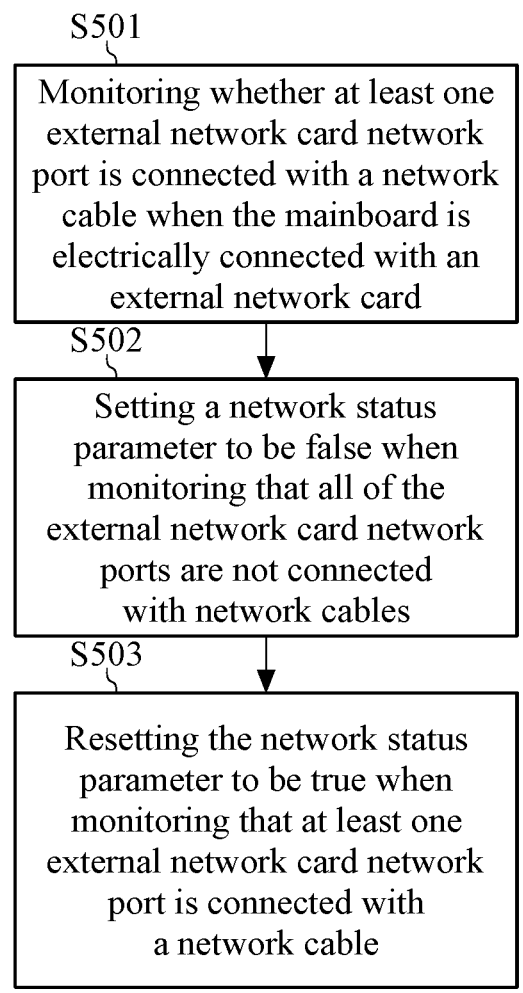
FIG. 5 is a flowchart of a method for monitoring a network connection status of an external network card via a baseboard management controller in accordance with a second embodiment of the present disclosure.

FIG. 5 is a flowchart of a method for monitoring a network connection status of an external network card by a baseboard management controller in accordance with a second embodiment of the present disclosure. As shown in FIG. 5, Step 501 is that the baseboard management controller continuously monitors whether at least one external network card network port is connected with a network cable by the inter-integrated circuit bus when the mainboard is electrically connected with an external network card. Step 502 is setting a network status parameter to be false by the baseboard management controller when the baseboard management controller monitors that all of the external network card network ports are not connected with network cables. Step 503 is resetting the network status parameter to be true when the baseboard management controller monitors that at least one external network card network port is connected with a network cable after the network status parameter was set as false.

According to the method for switching the shared network protocol of the baseboard management controller in accordance with an embodiment, the baseboard management controller actively may switch the physical link of the shared network protocol from the external network card network ports to the mainboard network ports when the baseboard management controller detects that all of the external network card network ports are not connected with the network cable by an inter-integrated circuit bus. On the other hand, when there is only one external network card network port reconnected with the network cable, the baseboard management controller actively may switch the physical link of the shared network protocol from the mainboard network ports to the external network card network ports. In this way, the shared network protocol may be maintained in a normal working state.

Although the present disclosure has been disclosed above in the foregoing embodiments, it is not intended to limit this invention. It is within the scope of this invention to be modified and modified without departing from the spirit and scope of the invention. Please refer to the attached claims for the scope of protection defined by the present invention.

What is claimed is:

1. A method for switching a shared network protocol of a baseboard management controller, comprising:
    determining whether a mainboard is connected with an external network card by a baseboard management controller;
    determining whether an external network card network port of the external network card is connected with a network cable by the baseboard management controller when the mainboard is connected with the external network card;
    connecting a physical link of a shared network protocol of the baseboard management controller with the external network card network port when the external network card network port is connected with the network cable; and
    connecting the physical link of the shared network protocol of the baseboard management controller with a mainboard network port of the mainboard when the external network card network port is not connected with the network cable.

2. The method in claim 1, wherein the baseboard management controller is mounted on the mainboard.

3. The method in claim 1, wherein the baseboard management controller has a general purpose input/output port, a network card slot is mounted on the mainboard, the general purpose input/output is electrically connected with the network card slot, the general purpose input/output has a first voltage level when the external network card is plugging into the network card slot, the general purpose input/output has a second voltage level different form the first voltage level when there is no external network card plugged into the network slot.

4. The method in claim 1, further comprising enabling the external network card network port by a network controller sideband interface driver of the baseboard management controller when the external network card network port is connected with the network cable.

5. The method in claim 1, further comprising enabling the mainboard network port by a network controller sideband interface driver of the baseboard management controller when the mainboard network port is connected with the network cable.

6. The method in claim 1, further comprising the baseboard management controller monitoring whether the external network card is connected with the network cable via an inter-integrated circuit bus when the mainboard is connected with the external network card.

7. The method in claim 6, wherein the baseboard management controller sets a network status parameter to be true when the baseboard management controller monitors that the external network card network port is connected with the network cable.

8. The method in claim 7, further comprising resetting the network status parameter to be false when the baseboard management controller monitors that the network cable is disconnected from the external network card network port after setting the network status parameter to be true.

9. The method in claim 6, wherein the baseboard management controller sets a network status parameter to be false when the baseboard management controller monitors that there is no network cable connected with the external network card network port.

10. The method in claim 9, further comprising resetting the network status parameter to be true when the baseboard management controller monitors that the external network card network port is connected with the network cable after the network status parameter was set as false.

* * * * *